June 7, 1966   EUGÈNE-PAUL MARICQ   3,254,980
ELECTROTHERMIC MACHINE FOR WELDING GLASS CONTAINERS, CHIEFLY
PHARMACEUTIC PHIALS
Filed Feb. 6, 1961   2 Sheets-Sheet 1
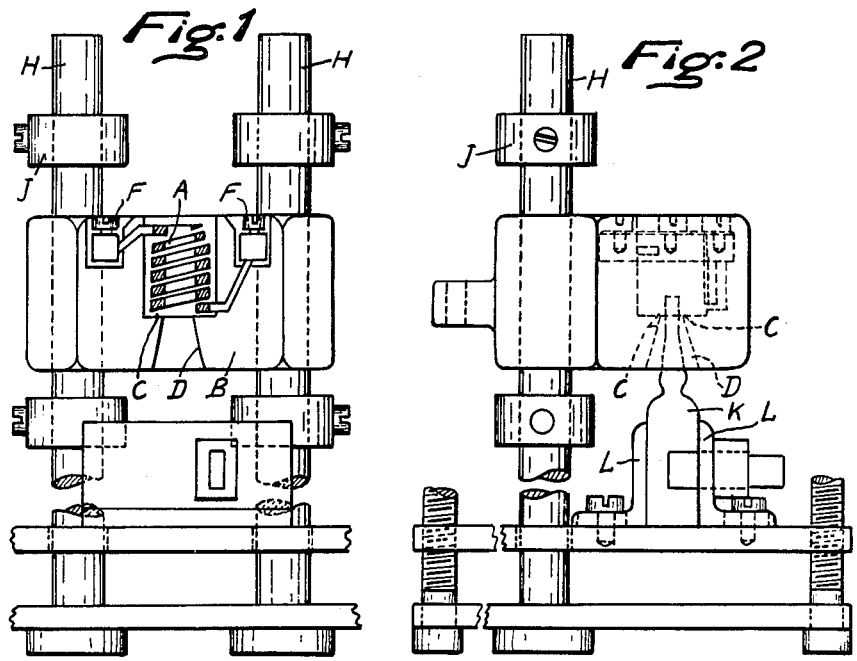
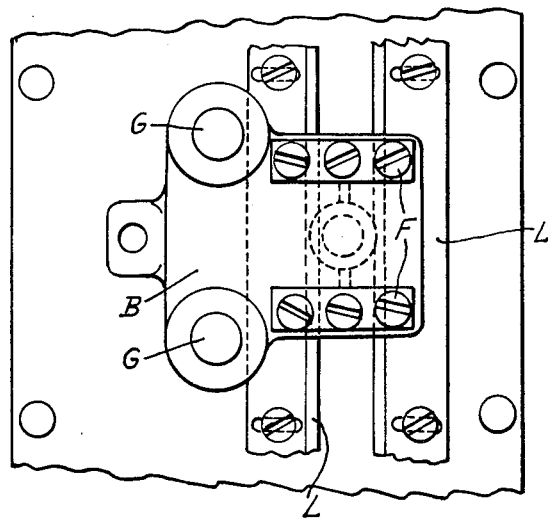
INVENTOR
EUGENE PAUL MARICQ
BY Irwin S. Thompson
ATTY.

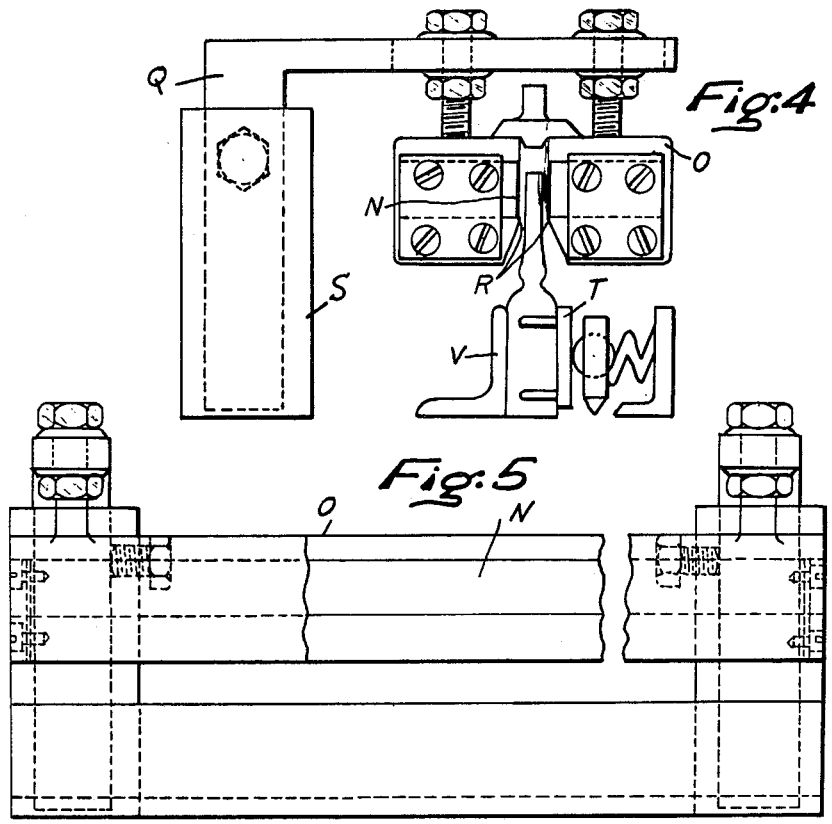
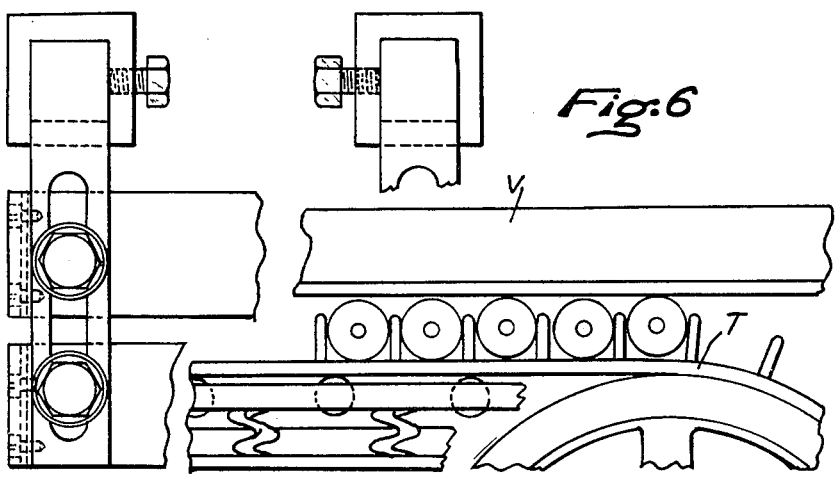

United States Patent Office 3,254,980
Patented June 7, 1966

3,254,980
ELECTROTHERMIC MACHINE FOR WELDING GLASS CONTAINERS, CHIEFLY PHARMACEUTIC PHIALS
Eugène-Paul Maricq, 6 Rue Veydt, Brussels, Belgium
Filed Feb. 6, 1961, Ser. No. 87,265
Claims priority, application Belgium, Feb. 8, 1960, 587,358
3 Claims. (Cl. 65—152)

My invention relates to a method and means which allow obtaining through electrothermal means the fluid-tight sealing of glass containers, chiefly pharmaceutical phials, by collapsing or drawing of their material, said method and means utilizing only electric energy.

A first advantage of my invention consists in its extremely easy adjustment, a second advantage consists in its very cheap character, in contradistinction with the methods now available which employ gas burners using coal gas, butane or propane, which require a combustion-supporting gas such as super-compressed air incorporating oxygen or otherwise, or oxygen alone. Such present methods have the drawback of requiring a difficult adjustment and of frequently leading to misadjustment as a consequence of the variations in the pressure of the gases which are used therein. Their use is also very expensive and they are extremely noisy.

A third advantage of my improved electrothermal method consists in that it allows furthermore sealing the phials in a sterile atmosphere and this is of interest in particular when such phials contain a vaccine, this sealing not being economically possible in the case of gas burners. Furthermore, my improved electrothermal method is perfectly silent.

My invention has also for its object an apparatus which resorts in association with electricity to a further supply of thermal energy or which is associated with another apparatus such as a phial-filling apparatus operating through a pump or otherwise. According to my invention, one or more parts enclosing the phial or the like article are heated electrically to the desired temperature and said heating parts may assume different shapes and match, if required, the surface of the article to be treated. They do not engage normally the surface of the glass, but this may occur in certain special cases and it may also be necessary in some cases to leave said parts inside the mass of molten glass.

I have illustrated by way of example in the accompanying drawings a preferred embodiment of the apparatus according to my invention. In said drawings:

FIG. 1 is a diagrammatic elevational view of a first embodiment of my invention.

FIG. 2 is a side view at right angles with reference to FIG. 1 and

FIG. 3 is a corresponding plan view.

FIGS. 4 to 6 are corresponding views of a modification.

In the apparatus illustrated in FIGS. 1 to 3, the welding is obtained by collapsing of the glass. The heating chamber includes the two parts A and B, the part A comprising an electrically heated resistance made of some conductive material such as steel containing 25% of chromium, and 20% of nickel, or else, pure or alloyed platinum. Said resistance is heated by a Joule effect to a temperature, say 1,000° C., higher than the temperature of melting of the glass to be treated. The resistance A is housed inside the outer part B made of refractory material, for instance soapstone. Said refractory part thus forms a chamber enclosing the resistance and provided with a throttled cross section underneath which the chamber flares downwardly, as shown at D. This throttled cross section C prevents the neck of the phial which is to be closed from engaging the wall of the part B, while the conical or frusto-conical surface D guides said neck and positions it centrally within the space enclosed by the resistance. The refractory part B carries wires E leading to the heating resistance, together with the terminals F ensuring the desired connections between said wires and the source of electrical supply. The refractory chamber B is provided with guiding bores G which allow the shifting of said chamber solely in a vertical direction, or, generally speaking, in a direction parallel with the axes of the phials to be sealed. Said guiding bores slidingly engage vertical rods H over which the refractory part B may thus slide throughout the extent defined upwardly and downwardly by two stops J.

On the other hand, the phials K to be treated are shifted in succession along the path defined by the guiding members L, the spacing of which is adjustable so as to hold the axes of the successive phials in registry with the heating chamber. Said members or guides L are also vertically adjustable.

A stop system M which is collapsible either vertically or laterally provides for the positioning of the phials inside the space between the guiding members L. The neck of each phial engages in its turn the heating chamber, the phial being pushed upwardly into it, or else, the heating resistance being shifted into a position in which it caps the phials, or again, these two movements may be associated.

The glass of the phial neck becomes soft and melts gradually so that it collapses and closes the body of the phial. The whole arrangement is controlled by a system of cams or the like mechanical means and it is controlled by hand or automatically by a motor or through gearing. The same apparatus may serve for sealing phials of various sizes and the adjustment is performed by removing the refractory part B with the heating resistance A carried by the latter and serving for a predetermined diameter of phial neck, after which it is replaced by another refractory part carrying a heating resistance corresponding to the diameter of the necks of the further phials which it is desired to seal.

The adjustment of the electric power is obtained by means of a rheostat or the like arrangement for modifying the current intensity. Since it is possible to resort to a transformer lowering the input voltage, there is no risk of any accidental contact with a highly energized lead.

A modification of the same arrangement involves a method of sealing by drawing. In such a case, the chamber B is similar to that illustrated in FIGS. 1 to 3, but it is provided with a lateral opening which, upon movement of the phial and/or of the chamber, allows positioning the heating resistance around the base of the neck of the phial. As a matter of fact, when the sealing is performed by drawing, the neck of the phial is longer and the end of said neck extending beyond the chamber is removed by means of tweezers, by hand or automatically.

In FIGS. 4 to 6, the arrangement illustrated is somewhat different, but is based on the same principle. It includes one or two heating resistances N, each of which is composed of one or more wires or metal strips heated by Joule effect to a temperature above the melting point of the glass. Each resistance is housed inside a removable refractory part O made, for instance, of soapstone. The refractory parts are provided each at its lower end with an inner flange R which prevents the neck of the phial from touching the heating resistance.

These refractory parts carrying the heating resistances are secured to cross-members Q made of metal or any other suitable material over which said refractory parts are adapted to be adjusted transversely. It is thus an easy matter to adjust the spacing between the heating resistances N. This allows using the same apparatus for sealing phials, the necks of which have different diameters. The cross-members Q are carried on uprights S on which they may be secured at any desired height. The same apparatus may thus serve for closing phials of different heights.

The phials are fed into the space between the heating resistances by an endless moving strip T extending underneath the latter and carrying projections between which the lower ends of the phials are nested. This strip produces the rotation of each phial around its axis by urging the body of the phial against an advantageously removable stationary member V, the position of which is adjustable to suit the different phial diameters. The phials may thus be sealed in a continuous manner through a mere progression between the heating resistances. The length of the suspended kiln thus formed may vary in accordance with various parameters such as the temperature of heating or the desired yield. The heating resistance may also be made of heterogeneous sections; for instance, one section may be of chromium-nickel steel of the type referred to and the second of alloyed or pure platinum without this widening the scope of the present invention as defined in the accompanying claims. The whole arrangement may be controlled by a mechanism of a conventional type, driven by hand, by a motor or through a transmission gear.

What I claim is:

1. An apparatus for sealing glass phials and the like glass containers provided with an open neck, comprising a refractory heating chamber having a substantially vertical axis and provided with a restricted opening in its bottom and a downwardly flaring extension underneath said opening, coiled electric resistance heating means carried inside said round chamber and lying coaxially with and above the opening in the chamber, a pair of horizontally extending parallel guiding members adapted to hold between them a phial underneath the chamber for engagement of the phial neck through the flaring extension and opening inside the chamber in coaxial relationship with the heating means, at least one collapsible stop adapted to engage transversely the phial registering with the chamber to hold it in position, and means for vertically adjusting the vertical position of at least one of the following parts: the chamber and the pair of horizontal guiding members.

2. An apparatus for sealing glass phials and the like glass containers provided with an open neck, comprising a refractory heating chamber extending along a substantially horizontal direction and provided with a narrow longitudinal opening in its bottom and a downwardly flaring extension to either side of and underneath said opening, parallel rectilinear electric resistance heating means carried inside said chamber and extending symmetrically to either side of and above the opening in the chamber, and means for shifting a phial longitudinally underneath said chamber to make the phial neck extend through the flaring extension and opening into the chamber between the two heating means.

3. An apparatus for sealing glass phials and the like glass containers provided with an open neck, comprising a refractory heating chamber extending along a substantially horizontally direction and provided with a narrow longitudinal opening in its bottom and a downwardly flaring extension to either side of and underneath said opening, parallel retilinear electric resistance heating means carried inside said chamber and extending symmetrically to either side of and above the opening in the chamber, an endless strip extending longitudinally underneath the chamber and provided with lateral recesses adapted to carry successive phials along a path registering vertically with the opening in the chamber to make the necks of the successive phials, engaging the flaring extension and the opening in the chamber, travel through the latter, and transversely adjustable guiding members facing the strip on the side of the phials opposed to the latter to engage frictionally said phials and urge them into rotation during their progression.

References Cited by the Examiner
UNITED STATES PATENTS

| | | | |
|---|---|---|---|
| 2,031,660 | 2/1936 | Loepsinger | 49—8 X |
| 2,265,359 | 12/1941 | De Neumann | 65—34 |
| 2,432,491 | 12/1947 | Thomas | 65 |
| 2,455,085 | 11/1948 | Oughton et al. | 49 |
| 2,529,109 | 11/1950 | Shields | 49—7 |
| 2,622,779 | 12/1952 | Smith et al. | 53—22 |
| 2,918,770 | 12/1959 | Stocker | 53—180 |
| 2,935,831 | 5/1960 | Saumsiegle | 53—39 X |
| 3,071,497 | 1/1963 | Hinson. | |

FOREIGN PATENTS

| | | |
|---|---|---|
| 577,738 | 5/1946 | Great Britain. |

DONALL H. SYLVESTER, *Primary Examiner.*
ROBERT A. LEIGHEY, *Examiner.*